April 14, 1936.  F. VAN DER WOUDE  2,037,606

ELECTRIC MOTOR

Original Filed May 19, 1930

INVENTOR.
Fritz Van Der Woude
BY Slough and Canfield
ATTORNEYS.

Patented Apr. 14, 1936

2,037,606

UNITED STATES PATENT OFFICE 2,037,606

ELECTRIC MOTOR

Fritz van der Woude, Elyria, Ohio, assignor to General Industries Company, Elyria, Ohio, a corporation of Ohio Original application May 19, 1930, Serial No. 453,627. Divided and this application October 19, 1934, Serial No. 749,089

12 Claims. (Cl. 172—275)

This invention relates to electric motors and particularly to single phase alternating current self-starting motors.

It is an object of my invention to provide an improved electric motor.

Another object is to provide an improved electric motor adapted to be operated by single phase alternating current.

Another object is to provide a motor of the general class referred to having improved means for rendering it self-starting.

Another object is to provide for electric motors of the general class referred to an improved construction of magnetic field frame and poles.

Another object is to provide an improved method of assembling the field frame and poles of an electric motor.

Another object is to provide an electric motor, the parts of which are compactly arranged whereby to provide the maximum of power output for the minimum of space occupied by the motor.

Another object is to provide an improved electric motor which will be cheap to construct and convenient to assemble and which will be efficient and durable in operation.

Other objects will be apparent to those skilled in the art to which my invention appertains.

My invention is fully disclosed in the following description taken in connection with the accompanying drawing, in which.

Figure 5:
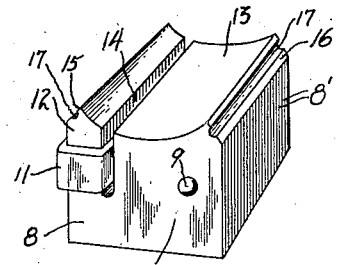
Fig. 5 is a perspective view illustrating separately a pole construction forming part of the embodiment of the other figures.
Figure 3:
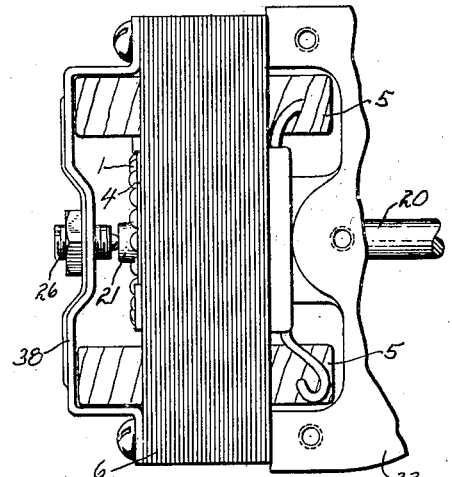
Fig. 3 is a top plan view of the embodiment of Fig. 1.
Figure 4:
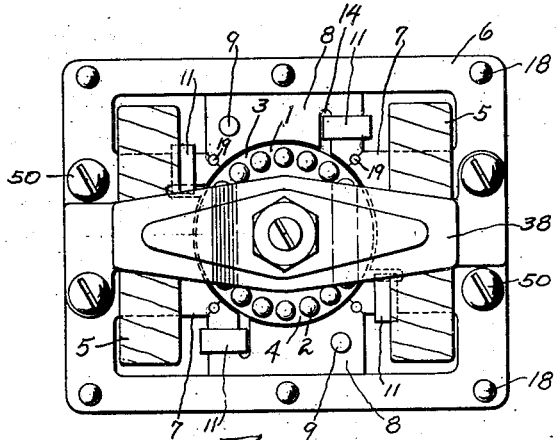
Fig. 4 is an end elevational view of the embodiment of Fig. 1.

The subject matter of this application is divisional from my copending application, Serial No. 453,627, filed May 19, 1930, for Improvements in speed control mechanism, and reference may be had thereto for an illustrative practical use or application of the electric motor of the instant application.

Referring now to the different figures of drawing in all of which like parts are designated by like reference characters, the electric motor of my invention which is of the inductor type comprises a rotor 1 made up by superposing a plurality of suitably apertured iron or alloy steel discs 3, disposing them in a pile intermediate of a pair of relatively heavy end discs 4, and projecting a plurality of parallel spaced copper rods 2 through suitable aligned perforations in the discs intraperipherally thereof, the ends of the rods being electrically joined to the end plates, for example as by riveting the outer end over and upon the end plates, the rods thus also serving to clamp the pile of discs between the end plates into a compact rigid assembly.

Rotors of this type which are exemplified in the disclosure of Patent No. 677,308 to Eichemeyer, dated June 25, 1901, are well known and will require no further description herein.

As illustrated, I preferably provide a pair of energizing field windings 5—5 for the stationary field of the motor which latter comprises a rectangular outer frame 6 made up of superposed iron or steel alloy stampings with a pair of integral field pole projections 7—7 projected inwardly from two opposite ends of the frame, between which the rotor 1 is journaled for rotation. An intermediate pair of relatively oppositely disposed field poles 8, one of which is shown in perspective view separately in Fig. 5, is likewise provided, but each of which is separately made up by providing a plurality of separate stampings 8', each of suitable like form, and superposing the stampings in the manner illustrated in Fig. 5, then riveting them together by an iron rivet 9 projected through suitable aligned perforations in a main pole portion 10 and forcing a heavy copper collar or shading coil 11 over a supplemental pole 12 provided by a slot 14. The pole pieces thus formed are provided with an arcuate pole face 13 interrupted by the slot 14, providing main and supplemental poles 10 and 12, respectively, the corners being removed as shown at 15 and 16 to provide inclined corner faces, each of the corner faces 15 and 16 being provided with longitudinally extending grooves 17—17.

The pole projections 7 are formed at their ends similarly to the poles 8 with corresponding arcuate surfaces, grooves, slots and shading coils.

In assembling the motor, the outer frame 6 is first assembled by superposing its laminations and riveting them together as by means of the rivets 18; then by placing the field energizing coils 5 on the inwardly projecting poles 7, the coils preferably being first form-wound and their central openings being large enough to slide over the previously applied shading coil. The intermediate poles are then slid into place as shown in Fig. 2 and then driving rods or wedges 19, preferably of copper, brass or like non-magnetic material, are driven into place in the space provided by the grooves 17 between the inclined faces 15 and 16 of the poles 8 and the contiguous like inclined faces of the poles 7.

In this manner the poles 8 are tightly wedged into place by their wedging engagement with the poles 7 and are brought into intimate pressure contact with the side portions of the outer frame 6 to make good magnetic circuit connections therewith.

Figure 2:
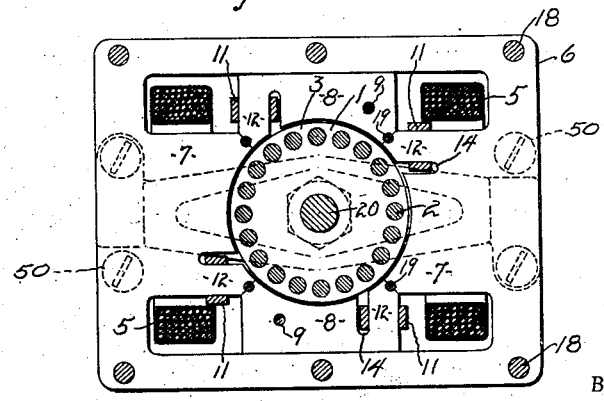
Fig. 2 is a sectional view taken from the plane 2—2 of Fig. 1.

It will be apparent by reference to Figs. 2 and 5 that the inclined faces 15 and 16 after metal has been removed to provide the grooves 17, are of relatively small area so that the magnetic area of contact between the poles 7 and 8 in each case is relatively small compared with the area of the outer magnetic frame interconnecting the poles. If desired, therefore, the rods or wedges 19 may be formed from magnetic material if the combined area of the faces 15 and 16 and of the wedges be kept correspondingly relatively small.

The construction above described provides a continuous magnetic pole face of hollow cylindrical form on the pole faces 7 and 8 jointly.

Figure 1:
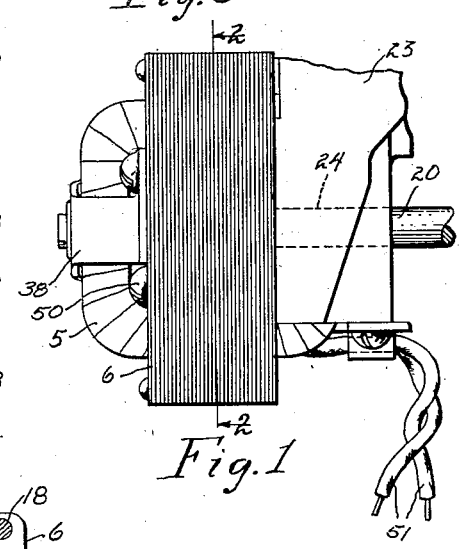
Fig. 1 is a side elevational view of a motor embodying my invention and associated with a part of an apparatus to be driven by the motor but which apparatus is broken away to simplify the drawing.

The discs 3, or rather the completely assembled armature comprising the discs, is preferably press-fitted upon a shaft 20. Any suitable bearing support may be provided for the shaft to rotatably support it. As indicated in Fig. 1 and as more completely illustrated and described in the above-mentioned parent application from which the instant application is divisional, the shaft 20 may be supported in a bearing bore 24 in the frame 23 to which the motor is secured and which may support apparatus to be driven by the shaft. The shaft also may make a thrust bearing contact at its end 21 with an adjustable thrust screw 26, mounted in a bracket 38 secured by screws 42 to the frame 23. The field frame and pole construction above described may be secured to the frame 24 by screws 50—50 projected through suitable perforations formed in the field frame.

The windings 5—5 are so wound and connected by terminals 51—51 to the source of alternating current that the poles 7—7, which as is well understood, may be called salient poles, are of the same polarity. As is apparent, the consequent poles 8—8 need not be provided with windings, thus effecting a considerable saving in volume of the motor and space required therefor which is a particular advantage when the motor is to be applied to certain classes of mechanism, for example the driving mechanisms of phonographs. It is believed that the action of the shading coils 11—11 to produce a two-phase magnetic field from the single phase energization and the action of this two-phase field upon the squirrel cage type of rotor described to produce torque in the same are sufficiently well known not to need description here.

Thus I have provided a self-starting single-phase induction motor having improved construction and method of assembly and which will occupy very small space for the horse-power delivered and which involves the minimum of parts and minimum of material and which will be rugged and durable in use and reliable and efficient in operation.

Changes and modifications may be made in the embodiment of my invention herein disclosed without sacrificing its advantages and without departing from the scope of the appended claims.

I claim:

1. An alternating current electric motor whose primary member has an even number of salient poles and is formed of a magnetic yoke structure carrying integrally half of the total number of poles and having the remaining poles set into the structure, and supported upon a portion of the yoke and a portion of an integral pole; the poles presenting a substantially continuous magnetic face to the secondary member of the motor and only each alternate pole carrying an exciting winding.

2. An electric induction motor in which the stator consists of a magnetic frame having inward integral projections which are wound to form salient poles of the same polarity and inset poles without exciting windings let into the frame, one between each pair of the projections, after the windings of the integral poles have been placed in position, and each supported upon a portion of the frame between a pair of projections and upon a pair of projections; the integral projections and the inset poles presenting a substantially continuous magnetic face to the rotor.

3. An electric motor according to claim 1 in which the inset poles are held in position by pins which act as wedging members between the inset pole and an integral pole.

4. An electric motor according to claim 2, in which the inset poles are held in position by pins which act as wedging members between the projections and the inset poles.

5. An electric motor according to claim 1, in which the inset poles are held in position by pins of non-magnetic material acting as wedging members between the inset poles and an integral pole.

6. An electric motor according to claim 2, in which the inset poles are held in position by pins of non-magnetic material which act as wedging members between the projections and the inset poles.

7. In an electric motor a field structure comprising an outer field frame, a pair of opposite integral inwardly projecting poles and a pair of opposite inwardly projecting separate poles, the latter having outer portions held in pressure contact engagement with adjacent overlapping portions of the field frame by wedging engagement of inner portions of the separate poles with adjacent inner portions of the integral poles.

8. A motor having a field structure as described in claim 7 and in which the poles have inner faces defining a substantially continuous cylindrical pole face.

9. A motor having a field structure as described in claim 7 and in which the wedgingly engaging inner portions respectively of the integral and separate poles are of smaller area than the cross-sectional area of the field frame in portions connecting the integral and separate poles.

10. A motor having a field structure as described in claim 7 and in which the wedgingly engaging portions of the poles have inclined confronting faces.

11. A motor having a field structure as described in claim 7 and in which the wedgingly engaging portions have inclined confronting faces and grooves are provided in the faces and wedge elements are driven into the grooves.

12. A motor having a field structure as described in claim 7 and in which windings of like polarity are provided on one pair of poles only, each pole having a shading coil embedded in its face and the poles having pole faces providing jointly a substantially continuous hollow cylindrical pole face.

FRITZ van der WOUDE.